United States Patent [19]
Sherif et al.

[11] Patent Number: 4,755,227
[45] Date of Patent: Jul. 5, 1988

[54] PRODUCTION OF SOLID PHOSPHORUS PENTIOXIDE CONTAINING MATERIALS FOR FAST-SETTING CEMENTS

[75] Inventors: Fawzy G. Sherif, Stony Point; Francis A. Via, Yorktown Heights, both of N.Y.

[73] Assignee: Stauffer Chemical Company, Westport, Conn.

[21] Appl. No.: 788,664

[22] Filed: Oct. 17, 1985

Related U.S. Application Data

[63] Continuation of Ser. No. 617,317, Jun. 7, 1984, abandoned, which is a continuation-in-part of Ser. No. 522,077, Aug. 11, 1983, abandoned.

[51] Int. Cl.$^4$ ............................ C04B 7/00; C09D 1/00
[52] U.S. Cl. ........................................ 106/85; 106/121
[58] Field of Search .................. 106/85; 501/111, 121, 501/123, 125, 133, 155

[56] References Cited

U.S. PATENT DOCUMENTS

| | | | |
|---|---|---|---|
| 2,450,952 | 10/1948 | Greger | 106/121 |
| 3,202,520 | 8/1965 | Enoch | 106/121 |
| 3,475,188 | 10/1969 | Woodhouse et al. | 106/105 |
| 3,525,632 | 8/1970 | Enoch | 106/85 |
| 3,673,111 | 6/1972 | Hovarth | 252/435 |
| 3,821,006 | 6/1974 | Swartz | 106/85 |
| 3,879,209 | 4/1975 | Limer et al. | 106/121 |
| 4,059,455 | 11/1977 | Limer et al. | 106/121 |
| 4,152,167 | 5/1979 | Horvitz et al. | 106/85 |
| 4,174,227 | 11/1979 | Tomic | 106/85 |
| 4,394,174 | 7/1983 | Tomic | 106/121 |
| 4,505,752 | 3/1985 | Sherif et al. | 106/85 |

Primary Examiner—John F. Niebling

[57] ABSTRACT

A solid phosphorus pentoxide containing material suitable for use in fast-setting cements can be produced by a process which comprises mixing a porous material with a liquid, phosphorus pentoxide containing material and heating the mixture until a dry solid is produced.

The solid phosphorus pentoxide containing material thus formed can then be dry blended with a solid component comprising magnesium oxide, magnesium hydroxide, magnesium carbonate or mixtures thereof. An aggregate can optionally be added into this dry blend.

The components of the resulting dry blend react in the presence of an aqueous component to form a monolithic solid.

19 Claims, No Drawings

PRODUCTION OF SOLID PHOSPHORUS PENTOXIDE CONTAINING MATERIALS FOR FAST-SETTING CEMENTS

This is a continuation- of application Ser. No. 617,317 filed, June 7, 1984, now abandoned, which is a continuation-in-part of application Ser. No. 522,077, filed Aug. 11, 1983, now abandoned.

BACKGROUND OF THE INVENTION

1. Field of the Invention

This invention relates to fast-setting cementitious compositions. More particularly, it relates to a process for producing solid phosphorus pentoxide ($P_2O_5$) containing materials suitable for use in fast-setting cements.

2. Related Art

Fast-setting cementitious compositions having utility for various purposes for which concretes are employed have been heretofore known.

U.S. Pat. No. 3,202,520 (Enoch, Aug. 8, 1965) discloses a rapid set non-hygroscopic cement composition consisting essentially of a blend of a phosphate derived from phosphoric acid and of alumina, and containing from 15 to 55 weight percent of $P_2O_5$ and from 45 to 75 weight percent of alumina, and from 5 to 18 weight percent of magnesium oxide. The phosphoric acid is used in its liquid state then moisture is removed by drying the blend above 212° F.

U.S. Pat. No. 3,525,632 (Enoch, Aug. 25, 1970) discloses a rapid setting concrete cement composition which comprises dry blending magnesium containing compounds, aluminum containing compounds and phosphorus containing compounds from stated sources in stated weight percentages, and then pulverizing the blended material without a separate drying stage. The phosphorus containing compound is a mixture derived from phosphoric acid, and at least 50 weight percent of one of trimagnesium phosphate, aluminum orthophosphate, and phosphoric anhydride.

U.S. Pat. No. 3,879,209 (Limes et al., Apr. 22, 1975) discloses a process for making a fast-setting concrete comprising establishing a mixture of an aggregate, containing at least 10 percent by weight of magnesia, and ammonium phosphates in aqueous solution. This patent further discloses that a commercial (agriculture fertilizer) product known as sequestered phosphatic solution (SPS) is particularly suitable as the source of the ammonium phosphate. The ammonium component is an essential feature of this invention.

U.S. Pat. No. 4,059,455 (Limes et al., Nov. 22, 1977) discloses a process for making a fast-setting concrete comprising establishing a mixture of an aggregate, containing at least 1% magnesia, and ammonium phosphates in aqueous solution. Again, the ammonium component is essential for attainment of the desired results of the invention.

U.S. Pat. No. 4,174,227 (Tomic, Nov. 13, 1979) discloses a grouting system comprising an acidic reactive component comprising at least one acidic oxy phosphorus compound selected from phosphoric acids, anhydrides of phosphoric acids and salts of phosphoric acids with multivalent metal cations, and a basic reactive component comprising at least one basic metal compound of a Group II or Group III metal capable of reacting with the oxy phosphorus compound(s) in the presence of water to form a monolithic solid. This patent teaches that the monovalent salts of phosphoric acid, e.g. the ammonium phosphates, do not develop early pull strength.

U.S. Pat. No. 3,821,006 (Schwartz, June 28, 1974) discloses a patching composition consisting essentially of a reactive component of MgO with an acid phosphate salt and an inert aggregate component. The particle size of the inert aggregate component is related to the compressive strength of the cement formed at an early cure age.

The mixtures employed in the methods of the patents discussed above set, and develop usable strength much more rapidly than conventional materials. Nonetheless, each of these patents is limited (as discussed above) and therefore distinguishable from the mixtures and processes of the present invention in several ways.

U.S. Pat. No. 3,673,111 (Hovarth, June 27, 1972) discloses a process for manufacturing a solid phosphoric acid catalyst in which a siliceous adsorbent is admixed with a polyphosphoric acid. The mixture is heated at an elevated temperature and thereafter extruded. The extrudate is further treated by drying first in a steam atmosphere and then in a dry air atmosphere. This patent does not teach a process for producing solid $P_2O_5$ containing material suitable for use in fast-setting cements but rather teaches a process for making a catalyst.

U.S. Pat. No. 3,475,188 (Woodhouse et al., Oct. 28, 1969) discloses a dry refractory composition consisting essentially of phosphates absorbed on diatomaceous earth up to 80% by weight being absorbed thereon, magnesium oxide and refractory aggregate. Compositions and processes in which well above 80% by weight of phosphates absorbed on diatomaceous earth are present would be advantageous.

A fast-setting cementitious composition in which the phosphorus pentoxide reactive component is a solid and further can be derived from industrial wastes and can be premixed and preblended with a solid component such as magnesium oxide would be advantageous in that an economic, solid blend could be easily packaged, inventoried, handled and transported to the intended application site, then combined at the site with a readily available aqueous component such as water to form a solid. For example, a solid $P_2O_5$ containing material could be premixed with a solid component, e.g. magnesium oxide, and optionally a solid aggregate to form a one component cement mixture, instead of the current two component $P_2O_5$ containing solution and MgO containing solid that are separately packaged. It would be even more advantageous to utilize a solid waste that heretofore has created significant disposal problems.

It is an object of the present invention to provide a process for producing solid phosphorus pentoxide containing materials suitable for use in fast-setting cements.

Other objects and advantages of the present invention are shown through the specification.

SUMMARY OF THE INVENTION

In accordance with the present invention, a process has now been discovered for producing solid phosphorus pentoxide containing material suitable for use in fast-setting cements. This process comprises mixing a porous material with a liquid, phosphorus pentoxide containing material then heating the mixture until a dry solid is produced.

The solid phosphorus pentoxide containing material thus formed can then be dry blended with a solid component comprising a magnesium containing compound. This solid component must be capable of being dry blended with the solid phosphorus pentoxide containing material without reacting therewith in the dry state and must further be capable of reacting with the phosphorus pentoxide containing material in the presence of an aqueous component to form a monolithic solid. The dry blend can further be comprised of an aggregate.

DETAILED DESCRIPTION OF THE INVENTION

The present invention comprises a process for producing solid phosphorus pentoxide containing materials suitable for use in fast-setting cements. This process comprises mixing a porous material with a liquid, phosphorus pentoxide containing material then heating the mixture until a dry solid is produced.

The liquid, phosphorus pentoxide containing material can be any material containing free or available $P_2O_5$ such as green acid. This material can be selected from various industrial and agricultural chemicals and wastes. Some examples of suitable $P_2O_5$ containing materials include aluminum phosphate solution; ammonium phosphate solution; calcium phosphate solution; bright dip phosphoric acid from metal polishing processes; phosphoric acid; waste phosphoric acid from agricultural chemical processes; steel phosphatizing sludge acid resulting from the pickling of steel to inhibit corrosion; arsenic sulfide sludge acid resulting from the treatment of $P_2O_5$ waste streams with $H_2S$ to remove arsenic; and any combination of the above liquids.

The liquid $P_2O_5$ containing material can further include various acidic phosphorus compounds, e.g., orthophosphoric acid, pyrophosphoric acids and other polyphosphoric acids and their salts.

A preferred liquid $P_2O_5$ containing material is ammonium phosphate fertilizer solution. This fertilizer solution contains a mixture of ortho- and polyphosphates and in its original aqueous state undergoes continuous hydrolysis upon standing wherein the weight ratios of the different phosphate forms keep changing, usually from high polyphosphate and low orthophosphate contents to low polyphosphate and high orthophosphate contents as the fertilizer ages. The polyphosphates of this fertilizer solution can include pyro, tri, tetra, etc., phosphate species. Because of this continuous hydrolysis, magnesium phosphate cements using liquid ammonium phosphate fertilizer as the $P_2O_5$ containing component exhibit unpredictable qualities. Usually, when a fresh fertilizer solution is used, the cement mixture does not set at all or only forms a weak cement, and when an older fertilizer solution is used, the cement sets very rapidly with little or no working time to apply the cement. Liquid fertilizer solution upon standing precipitates hard to handle insolubles and in cold weather the liquid freezes and gels creating more handling problems.

When the fertilizer solution is absorbed into the porous material of this invention, the fertilizer is held in a bound form and this composition is much more thermally stable in a temperature range of from ambient to about 120° C. than the original fertilizer solution. The resulting dry solid maintains a constant phosphate distribution between the ortho- and polyphosphate species and does not hydrolyze as the original fertilizer solution would.

Liquid ammonium phosphate fertilizer solutions with a low polyphosphate content, from about 0 to 20 weight percent, form a cement with inadequate working time and those fertilizer solutions with a high polyphosphate content, about 70 weight percent and above, form a very slow setting and weak cement. Fertilizer solutions with a polyphosphate content of about 20 to about 70 weight percent form the best cements when absorbed into diatomaceous earth and heated slowly to dryness. However, high polyphosphate content fertilizer solutions can form acceptable cements when these solutions are absorbed in diatomaceous earth and heated to dryness.

A dry blend capable of forming a fast-setting cement can be formulated using the solid $P_2O_5$ containing material with the quantity and quality of the other cement components being chosen to optimally fit the particular distribution of phosphate species "frozen" in the dry solid stable form. When hydrated, in its dry form, it is storable, flowable and non-hygroscopic.

The porous material which can be employed in this invention includes diatomaceous earth, kieselguhr, artificially prepared porous silica, vermiculite, alumina, and such naturally occurring substances as various fuller's earth and clays such as bentonite, montmorillonite, acid treated clays and the like. Each porous material which may be used will exert its own specific influence upon the solid $P_2O_5$ containing material formed and the resulting fast-setting cement which will not necessarily be identical with that of other members of the class. The porous material can be inert or partially inert. Members of the class of porous material can be used separately or in combination with each other.

A preferred porous material is diatomaceous earth. The highly porous diatomaceous earth can absorb much more than 80% by weight, based on the weight of diatomaceous earth, of a liquid containing phosphate, e.g., liquid ammonium phosphate fertilizer solution and absorption of 225% and above are preferred. Upon drying the diatomaceous earth with the liquid containing phosphate absorbed therein, a solid $P_2O_5$ containing material forms.

The diatomaceous earth can comprise from about 30% to about 90% by weight of the solid $P_2O_5$ containing material with about 30% to about 65% being preferred; can have a density of from 7.0 to 19.5 lbs/cubic foot (0.112 to 0.312 gms/cc); can have water absorption of from 170% to 255% by weight; and can have surface area of from 1 to 100 $M^2/g$. It is believed that when diatomaceous earth is mixed with liquid ammonium phosphate fertilizer and heated to form the dry solid, more than a physical entrapment of the $P_2O_5$ containing material occurs.

The liquid $P_2O_5$ containing material is mixed with the porous material at ambient temperature to form a slurry or paste. The amount of liquid $P_2O_5$ material added is important. Amounts up to that which will fill the pores of the porous material can be used with one drying step, however amounts exceeding the pore volume of the porous material can be absorbed with several drying steps. The slurry or paste is heated to a temperature of from about 60° C. to about 200° C. to drive off moisture and other volatile impurities until a dry solid is produced.

The rate of heating is adjusted so that, upon drying, the pores of the porous material are not blocked with the $P_2O_5$ containing material, but remain available to the aqueous component when the cement is made. Sufficient porous material should be used to have enough pore volume available to absorb a suitable amount of the $P_2O_5$ containing material. Upon drying, most of the aqueous component will be driven off, leaving solid $P_2O_5$ material deposited inside and over the walls of the microscopic pores.

The starting materials, i.e. the liquid $P_2O_5$ containing material, and the porous material are mixed in the proportions necessary to form a dry solid comprising from about 10% to about 70% by weight of the $P_2O_5$ containing material and from about 30% to about 90% by weight of the porous material in the resulting solid $P_2O_5$ containing material.

The solid $P_2O_5$ containing material prepared by the processes of this invention is dry blended with a solid component comprising a magnesium containing compound to yield a dry blend capable of forming a fast-setting cement when reacted with an aqueous component in accordance with this invention. The solid $P_2O_5$ material can optionally be milled and classified prior to being dry blended. This material usually has a particle size range of from 100 to 325 mesh and a surface area of from 1 to 10 $M^2/g$.

Generally, the fast-setting cement of this invention can be used for producing fast-setting concrete structures, e.g., structures suitable for roadway construction and roadway patches or other load-bearing uses, however in its broader aspects, the invention is generally applicable to preparing concrete structures with various characteristics, e.g., high or low strength, for a variety of other purposes as well. The characteristics of any particular concrete structures formed can depend upon the weight ratio of the various components, the nature of the aggregate employed, the temperature conditions of application and the curing conditions as well as other factors.

Fast-setting cement can be applied indoors or outdoors to concrete drives, storage yards, warehouse and factory floors to repair and restore damaged surfaces. Fast-setting cement can be used to fill structural cracks in slabs, and repair highway median barrier walls. This type of cement can be used in almost any situation requiring a quick, permanent repair of concrete. In addition the fast-setting cement can be used for binding and coating metals and woods for structural and flame resistant applications.

Generally, the setting time for fast-setting cement varies widely and can range from a few seconds up to a few hours. As a practical matter, the setting time must be sufficient to allow the dry blend to be thoroughly mixed with the aqueous component to form a slurry or a non-collapsible putty and be applied to the intended area, whether a mold or a patch, prior to hardening into a monolithic solid. In quantitative terms, fast-setting means that the cement hardens in less than 30 minutes, usually in about 1 to 10 minutes, and reaches more than 500 psi of compression strength in usually less than two hours.

The dry blend of the present invention comprises a solid $P_2O_5$ containing material prepared according to the processes of this invention and a solid component selected from at least one of the group consisting of magnesium containing compounds. The preferred magnesium containing compounds are magnesium oxide, magnesium hydroxide and magnesium carbonate. These compounds must be capable of being dry blended with the solid $P_2O_5$ containing material without reacting therewith. However, in the presence of an aqueous component the dry blend will react to form a monolithic solid. Mixtures of these magnesium compounds can also be employed.

A preferred solid component contains MgO. This MgO can be of low reactivity, of high reactivity or a mixture of low and high reactivity wherein the ratio of the constituents of the mixture is selected to achieve the working time and cement strength desired. This preferred solid component can usually be from 25% to 50% by weight of the overall dry blend. Aggregate usage can range from 0% to 400% by weight of the dry mix with a range of from about 40% to about 150% by weight of the dry mix being preferred.

A particulate aggregate, preferably graded sand, can be included in the dry blend in a controlled amount as a filler. Aggregate can greatly enhance the strength of the hardened concrete cement. Other aggregate materials which can be used include particles of competent rocks or rock-forming minerals such as granite, basalt, dolomite, andesite, feldspars, amphiboles, pyroxenes, olivine, gabbro, rhyolite, syenite, diorite, dolerite, peridotite, trachyte, obsidian, quartz, etc., as well as materials such as slag, cinders, fly ash, glass cullet, wood chips, and fibrous materials such as chopped metal wire (preferably steel), glass fibers, asbestos, cotton, and polyester and aramide fibers. Aggregates having different particle shapes and sizes can be used. Mixtures of different aggregates can also be used. The porous material used to absorb the liquid $PP_2O_5$ containing material will further function as an aggregate.

The dry blend remains a free flowing powder until it is contacted with an aqueous component, preferably water, then a reaction occurs forming a fast-setting cement. The amount of aqueous component used is important. Too much water can convert the dry blend into a thin slurry that will not set until substantial dehydration occurs; and, too little water will not wet the dry blend sufficiently to allow the necessary chemical reaction. The optimum amount of water will depend upon the particular physical characteristics of the constituents of the dry blend, e.g., absorbency, surface area, etc. However, the optimum amount of water must be sufficient to adequately wet the dry blend and optional aggregate mixture to form a thick slurry or non-collapsible putty. This optimum amount of water can be determined on a blend by blend basis.

The various blends of this invention and the process of combining them with an aqueous component result in the production of unique fast-setting cements.

In a particular embodiment of the dry blend according to this invention, the components of the solid $P_2O_5$ containing material are an ammonium phosphate solution and diatomaceous earth; the solid component is magnesium oxide; and the aggregate is silica. The resulting cement had adequate working time and an acceptable strength.

The following Examples illustrate certain embodiments of the invention but should not be construed in a limiting sense. The scope of protection sought is set forth in the claims which follow the Examples.

EXAMPLE 1

Spent bright dip acid from metal polishing processes containing 27% phosphorus pentoxide ($P_2O_5$) and 3% aluminum oxide ($Al_2O_3$) was added to CELITE diatomaceous earth in a weight ratio of 2:1. A paste was formed. The resulting paste was dried at 110° C. for 16 hours to drive off water and other volatile inorganic or organic impurities. A dry solid was formed. This dry solid contained 31% $P_2O_5$ and 4% $Al_2O_3$.

The resulting dry solid was milled and then blended with a magnesium oxide (MgO)/gravel mixture in a ratio of 60 parts by weight solid acid to 210 parts by weight MgO/gravel mixture. The MgO/gravel mixture contained 20 parts by weight MgO and 80 parts by weight gravel. Seventy parts by weight of water were then added to the resulting blend to form a slurry. This slurry was poured into a 2″ cube mold. The slurry hardened within 5 minutes. Compression strength of the resulting cement was 900 psi after 2 hours and 3250 psi after 28 days.

EXAMPLE 2

900 gms of spent bright dip acid from metal polishing processes containing 27% $P_2O_5$ and 3% $Al_2O_3$ was mixed with 300 gms of monoaluminum phosphate solution containing 33.5% $P_2O_5$ and 8% $Al_2O_3$. This mixture was absorbed into 500 gms of CELITE diatomaceous earth. The resulting paste was dried at 130° C. for 16 hours. The dry solid was found to contain 25.6% $P_2O_5$. This dry solid was blended with a MgO/gravel mixture in a 1:3.2 weight ratio then stored in plastic bags for 4 weeks. The MgO/gravel mixture had the same weight composition as that of Example 1.

8 minutes. Compression strength of the resulting cement was 2000 psi after 2 hours and 5250 psi after 28 days.

In a comparative example, using a solution of ammonium phosphate instead of the dry solid, the slurry hardened after 8 minutes and had a compression strength of 2000 psi after 2 hours.

EXAMPLES 4–9

4000 gms of diatomaceous earth STANDARD SUPER-CEL was mixed with 9000 gms of liquid ammonium phosphate fertilizer containing 34% $P_2O_5$. The mixture was dried at 105° C. for 16 hours. The dry material was milled to give by weight 11.8% greater than 100 mesh size, 23.6% between 100 and 200 mesh and 64.6% less than 200 mesh. The dry material contained 36.0% $P_2O_5$. The pH of the dry material was 5.6. Various mixtures of this material each with a dead burnt MgO, a more reactive MgO and aggregates were prepared. Water was added to each mixture and the slurries resulting were poured into 2″ cubes or 2″×4″ cylinders. Initial set times and the compression strengths after 2 hours were measured.

The composition of these mixtures and the measurements taken are summarized in the following table.

TABLE I

| Example No. | Solid $P_2O_5$ Wt. % | MgO Wt. % Dead Burnt | MgO Wt. % More Reactive | Aggregate Wt. % | $H_2O$ Wt./100 wt. | Set Time, Initial, Min. | Compression Str., psi/2 hr. |
|---|---|---|---|---|---|---|---|
| 4 | 26.9 | 0 | 14.6 | 58.5 | 14.2 | 6 | 4300 |
| 5 | 26.9 | 3.6 | 11.0 | 58.5 | 14.2 | 7 | 3150 |
| 6 | 26.9 | 7.3 | 7.3 | 58.5 | 14.2 | 10 | 2950 |
| 7 | 26.9 | 11.6 | 3.6 | 58.5 | 14.2 | 15 | 2250 |
| 8 | 26.9 | 14.6 | 0 | 58.5 | 14.2 | 20 | 1050 |
| 9 | 24.7 | 6.7 | 6.7 | 61.8 | 12.4 | 11 | 3550 |

After the 4 weeks storage period the cement dry blend was still dry and free-flowing. Upon adding 60 parts by weight of water, a slurry was formed. This slurry hardened after 3 minutes. The compression strength was 900 psi after 2 hours and 3750 psi after 28 days.

EXAMPLE 3

500 gms of CELITE diatomaceous earth was mixed with 1320 gms of liquid ammonium phosphate fertilizer. The fertilizer contained 34% $P_2O_5$. The semi-solid resulting from the mixture was dried at 105° C. and milled to 14 mesh particles. The $P_2O_5$ content of the dry solid was found to be 36%.

60 gms of the dry solid was blended with 190 gms of a mixture containing 75% silica aggregates and 25% MgO. 40 gms of water was added to the blend and stirred thoroughly to form a slurry. This slurry was poured into a 2″ cube mold. The slurry hardened after

EXAMPLES 10–15

These examples demonstrate the functional properties of the solid $P_2O_5$. Not all ammonium phosphate fertilizer solutions form a desirable cementitious material with MgO, especially when the solutions are fresh and clear. The set time is usually too long and the compression strength after 2 hours is too low, see Examples 10–14. However, when the inactive fertilizer solution is absorbed into the pores of the porous material and heated, the solid $P_2O_5$ porous material composite forms a desirable cement when mixed with MgO, aggregate, and water as shown in Examples 14 and 15.

TABLE II

| Example No. | Type of Fertilizer Solution | % of Fertilizer Solution | % MgO | % Aggregate | % Diatom. Earth | Initial Set Min. | $H_2O$ cc | Compression Strength/ 2 Hr. |
|---|---|---|---|---|---|---|---|---|
| 10 | Fresh clear 11-37-0 (c) | 13.3 | 13 | 73 | — | 12 | — | 640 psi |
| 11 | Fresh clear 10-34-0 (c) | 17.6 | 16.5 | 65.9 | — | 8 | — | <100 psi |
| 12 | Fresh clear 11-37-0 (c) | 13.3 | 13 | 60.4 | 13.3 | — | — | (a) |
| 13 | Fresh clear 11-37-0 (c) | 26.6 | 11 | 51.1 | 9.2 | 20 | — | 640 psi |
| (b) 14 | Fresh clear 11-37-0 (c) | 13.6 | 13.4 | 73.7 | 11.1 | 8 | 50 | 2323 psi |
| (b) 15 | Fresh clear 11-37-0 (c) | 13.6 | 13.4 | 61.9 | 11.1 | 8 | 50 | 2220 psi |

(a) no cement forms; stays a powder.
(b) fertilizer solution mixed with diatomaceous earth and dried at 105° C./16 hrs. prior to mixing with MgO aggregate.
(c) the first number of e.g., 11-37-0, represents the weight concentration of ammoniacal nitrogen, the second number represents the weight concentration of $P_2O_5$ and the third number represents the weight concentration of potassium.

What is claimed is:

1. A process for producing solid phosphorus pentoxide-containing material suitable for use in producing a fast-setting, predominantly magnesium phosphate cement which comprises mixing a porous, inert material with a sufficient amount of liquid, phosphorus pentoxide-containing material to form at least a paste, said inert material containing substantially no alumina reactive with the liquid, phosphorus pentoxide-containing material, and heating the resulting mixture, prior to addition of a magnesium-containing material, to produce therefrom a dry solid capable of further reaction with magnesium-containing material and water at ambient temperature to form a solid, predominantly magnesium phosphate cement having a compressive strength of at least 500 psi in less than two hours.

2. The process of claim 1 wherein the mixture is heated at a temperature of from about 60° C. to about 200° C.

3. The process of claim 1 wherein the liquid, phosphorus pentoxide containing material is selected from industrial and agricultural chemicals and wastes.

4. The process of claim 1 wherein the liquid, phosphorus pentoxide containing material is selected from an aluminum phosphate solution, phosphoric acid solution, ammonium phosphate solution, calcium phosphate solution and mixtures thereof.

5. The process of claim 1 wherein the liquid phosphorus pentoxide containing material is an ammonium phosphate solution having a polyphosphate content ranging from about 20% to about 70% by weight.

6. The process of claim 1 wherein the dry solid produced contains from about 10% to about 70% by weight of the phosphorus pentoxide containing material.

7. The solid phosphorus pentoxide containing material resulting from the process of claim 1.

8. The solid phosphorus pentoxide containing material resulting from the process of claim 2.

9. The solid phosphorus pentoxide containing material resulting from the process of claim 3.

10. The solid phosphorus pentoxide containing material resulting from the process of claim 4.

11. The solid phosphorus pentoxide containing material resulting from the process of claim 5.

12. The solid phosphorus pentoxide containing material resulting from the process of claim 6.

13. A dry blend capable of forming a fast-setting, predominantly magnesium phosphate cement when reacted with an aqueous component comprising:
(a) a solid phosphorus pentoxide-containing material which is prepared by mixing a porous, inert material with a sufficient amount of liquid, phosphorus pentoxide-containing material to form at least a paste, said inert material containing substantially no alumina reactive with the liquid, phosphorus pentoxide-containing material, and heating the resulting mixture, prior to addition of a magnesium-containing material, to produce therefrom a dry solid; and
(b) a solid component comprising a magnesium-containing compound, said solid component capable of being dry blended with said solid phosphorus pentoxide-containing material without reacting therewith and further capable of reacting with said phosphorus pentoxide-containing material in the presence of said aqueous component at ambient temperature to form a solid, predominantly magnesium phosphate cement having a compressive strength of at least 500 psi in less than two hours.

14. The dry blend of claim 13 further comprising an aggregate.

15. The dry blend of claim 14 wherein the magnesium containing compound is magnesium oxide, hydroxide, carbonate or mixtures thereof.

16. The dry blend of claim 13 wherein the solid phosphorus pentoxide containing material comprises from about 50% to about 75% by weight.

17. The dry blend of claim 13 wherein the magnesium containing compound is magnesium oxide, hydroxide, carbonate or mixtures thereof.

18. The dry blend of claim 14 in which the liquid, phosphorus pentoxide containing material is an ammonium phosphate solution, the porous material is diatomaceous earth, the solid component is magnesium oxide, and the aggregate is silica.

19. The dry blend of claim 14 wherein the aggregate content by weight can be as high as 400% of the combined weight of the solid phosphorus pentoxide material and the solid magnesium component.

* * * * *